United States Patent [19]

Hughes et al.

[11] 4,199,369
[45] Apr. 22, 1980

[54] AQUEOUS FORTIFIED ROSIN DISPERSIONS

[75] Inventors: Richrd M. Hughes, Pennant Hills; Heinz Warnecke, Epping, both of Australia

[73] Assignee: Hercules Incorporated, Wilmington, Del.

[21] Appl. No.: 918,011

[22] Filed: Jun. 22, 1978

Related U.S. Application Data

[63] Continuation-in-part of Ser. No. 740,583, Nov. 10, 1976, abandoned.

[30] Foreign Application Priority Data

Nov. 17, 1975 [AU] Australia .............................. PC4005

[51] Int. Cl.² ............................................. C08L 93/04
[52] U.S. Cl. .................................................. 106/238
[58] Field of Search ........................ 106/238; 162/180

[56] References Cited

U.S. PATENT DOCUMENTS

| | | | |
|---|---|---|---|
| 2,176,423 | 10/1939 | Jaeger | 260/481 |
| 2,393,179 | 1/1946 | Mashburn | 106/143 |
| 2,628,918 | 2/1953 | Wilson | 106/238 |
| 2,684,300 | 7/1954 | Wilson et al. | 106/238 |
| 3,329,640 | 7/1967 | Scotti | 260/29.6 MQ |
| 3,565,755 | 2/1971 | Davison | 162/168 |
| 3,582,464 | 6/1971 | Aldrich | 162/180 |
| 3,906,142 | 9/1975 | Dowthwaite et al. | 106/144 |
| 3,960,780 | 6/1976 | Murata et al. | 252/551 |
| 3,966,654 | 6/1976 | Aldrich | 260/24 |
| 4,071,375 | 1/1978 | Ishibe | 106/238 |
| 4,113,506 | 9/1978 | Sackmann et al. | 162/180 |

FOREIGN PATENT DOCUMENTS

| | | |
|---|---|---|
| 69365 | 11/1975 | Australia. |
| 399874 | 7/1934 | Belgium. |
| 1131348 | 6/1962 | Fed. Rep. of Germany. |
| 2435614 | 2/1975 | Fed. Rep. of Germany. |
| 2437656 | 2/1975 | Fed. Rep. of Germany. |
| 2426038 | 12/1975 | Fed. Rep. of Germany. |
| 781729 | 5/1935 | France. |
| 2240264 | 3/1975 | France. |
| 1442074 | 7/1976 | United Kingdom. |
| 4,199,369 | 4/1980 | Other Publications. |

*Primary Examiner*—Theodore Morris

[57] ABSTRACT

In the inversion process for preparing paper size from fortified rosin wherein a water-soluble dispersing agent including an ethylene oxide sulphate group is used to provide a stable aqueous dispersion of fortified rosin; and an invert size produced by such a process.

41 Claims, No Drawings

AQUEOUS FORTIFIED ROSIN DISPERSIONS

This application is a continuation-in-part of application Ser. No. 740,583, filed Nov. 10, 1976 now abandoned.

This invention relates to a method of preparing aqueous dispersions of fortified rosin, to the aqueous dispersions thus prepared, and to their use in the manufacture of sized paper products.

Internal sizing of paper with rosin is discussed by Casey, Pulp and Paper, Second Edition, Volume II: Papermaking, Chapter XIII, pages 1043–1066, reference to which is hereby made.

At page 1048, Casey discusses fortified rosin size and states that fortified rosin sizes are made by reacting maleic anhydride or other dienophiles with rosin to increase the number of carboxylic acid groups. Casey also states that a typical fortified size may contain about 1% to 30% of maleopimaric acid anhydride.

Casey, at page 1047, under the heading "Free Rosin Size", states that the relative merits of high free rosin size and low free rosin size has been a controversial subject for many years but that it is now pretty generally recognized that high free rosin size results in better sizing and uses less alum.

At page 1050, under the heading "Protected Rosin Size", Casey states that by using a protective colloid it is possible to prepare highly stable size containing as high as 90% free rosin. At page 1051, Casey discusses the Bewoid process for preparing a high free rosin size and states that Bewoid size, as usually prepared, contains about 90% free rosin dispersed in a small amount of rosin soap and stabilized by the presence of about 2% casein or other protein. The casein is used as a protective colloid to prevent growth of rosin particles, thereby maintaining them in a state of fine subdivision.

Casey states further that the Bewoid process involves the mechanical subdivision of rosin in the presence of about 1 to 2% sodium hydroxide and about 2% casein. The rosin is heated and subjected to mechanical shearing stress until it is subdivided into small particles. A small amount of caustic soda (1.6 parts per 100 parts of rosin) is then added to the melted rosin to saponify part of it, and then casein (2.0 parts casein dispersed in 0.2 part caustic) is added to stabilize the dispersed particles of rosin. The dissolved casein is run into the molten rosin under vigorous agitation, after which an additional small amount of caustic (0.2 part) is added or the hot rosin melt is injected into water containing casein. Water is finally added to produce a finished dispersion containing about 45% solids, which is used in this form. This method is sometimes referred to in the art as the "inversion process of preparing rosin size" and the rosin size thus produced referred to as "invert size".

Using the inversion process, Mashburn, U.S. Pat. No. 2,393,179 prepared a free rosin size using a non-alkaline dispersing agent, such as sulfonated higher fatty alcohol, in place of sodium hydroxide. The rosin is melted and the desired amount of dispersing agent is added with sufficient agitation to form a homogeneous molten mass. A substantially neutral or slightly acid aqueous solution or dispersion of a protective colloid, such as casein, is then added gradually with rapid stirring whereby there is produced a high solids paste-type dispersion which is then diluted with water to a solids content of 40% to 60% by weight.

Casey, at pages 1051 and 1052, discusses the Prosize process for producing a protected size containing a high free rosin content. The rosin particles are prevented from growing into larger aggregates by the presence of a surface-active protein such as soybean protein.

German Pat. No. 1,131,348 states that free rosin sizes are dispersions of unsaponified resin acids with a certain percentage of rosin soap. The dispersions are prepared by the inversion process. They are mostly used with free rosin content of 60% to 95% and contain, besides rosin, auxiliary emulsifiers and stabilizers such as stearates, triethanolamine, casein, and waxes.

German Pat. No. 1,131,348 further states that, heretofore, the fortified rosins have not been suitable for the preparation of dispersions since they have mostly too high melting points, have a tendency to crystallization, or form, during dispersing, fine crusts which lead to sedimentation phenomena. German Pat. No. 1,131,348 discloses and claims a paper size and a process for the preparation of a paper size in the form of an aqueous dispersion with a high free rosin content from fortified rosin characterized in that the fortified rosin is mixed with fatty acids, fatty acid mixtures, and/or naphthenic acids at elevated temperatures and that the dispersion is carried out in the known manner. The process used in this patent is the inversion process.

U.S. Pat. No. 3,565,755 discloses a substantially homogeneous stable aqueous suspension of rosin-base material in a state of fine subdivision. The rosin-base material can be all fortified rosin or it can be a rosin-fortified rosin mixture. A very small amount of the rosin-base material is saponified and functions as dispersing agent for the rosin-base particles. This composition, which consists essentially of the rosin-base material, the saponified rosin-base material, and water, is used in the sizing of paper. The size of U.S. Pat. No. 3,565,755 is a high free rosin size in that it contains only a very small amount of saponified rosin-base material. Further, it has good stability (good shelf life) for prolonged periods of time and does not require the use of the stabilizers heretofore used in the preparation of stable high free rosin sizes such, for example, as casein and soybean protein.

In the process of U.S. Pat. No. 3,565,755, a material such as a salt of rosin or a salt of fortified rosin, or an alkaline material, such as sodium hydroxide, is dissolved in water. The resulting aqueous solution is mixed with a solution of a water-immiscible organic solvent such as benzene, which has dissolved therein fortified rosin. The resulting mixture is homogenized to produce a stable emulsion and then the organic solvent is removed to provide a stable aqueous dispersion.

Australian patent application No. 69365/74, filed May 24, 1974, discloses a process for preparing an essentially stable aqueous dispersion of rosin-base material useful in the sizing of cellulosic papermaking fibers which comprises homogenizing under a pressure of from about 2000 p.s.i.g. to about 8000 p.s.i.g. and at a temperature of from about 150° C. to about 195° C. an unstable aqueous dispersion containing, by weight, at least 5% solids, the solids consisting essentially of, by weight, from 0% to about 95% rosin and from 100% to 5% of an adduct reaction product of rosin and an acidic compound containing the

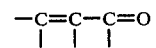

group, the amount of adducted acidic compound being from about 1% to about 20% of the total solids weight, characterized in that the process is carried out in the presence of an anionic dispersing agent. The anionic dispersing agent can be saponified rosin base material, sodium alkyl benzene sulfonate, sodium naphthalene sulfonic acid, sodium lauryl sulfate, and the ammonium salt of the sulfate ester of an alkylphenoxy(polyethyleneoxy)ethanol.

Swedish patent application No. 7410018-1 discloses a substantially stable aqueous dispersion, consisting essentially of water, rosin material, and as a stabilizer for the rosin material an alkali metal alkyl benzene sulfonate, said alkyl benzene sulfonate being present in an amount sufficient to stabilize said rosin material. The dispersions are prepared by passing a prepared mixture of the components through an homogenizer.

U.S. Pat. No. 3,906,142 of Sept. 16, 1975, discloses an agent for sizing paper without the use of aluminum sulfate, which comprises a stable aqueous dispersion of fortified rosin, fortified by reaction with an alpha, beta-unsaturated carboxylic acid or anhydride; a protective colloid, such as casein; and a volatile base, such as ammonia; at least 90% of said fortified rosin being unsaponified.

The method used in U.S. Pat. No. 3,906,142 is the inversion process for preparing size and consists of melting fortified rosin in a vessel provided with stirring and heating mechanism. A dispersing and stabilizing agent is then prepared in a separate vessel by dissolving a measured quantity of a protective colloid, such as casein, and a measured quantity of a volatile base, such as ammonia in water. The next step in the manufacture of the sizing agent is to add quickly, to the molten rosin, the prepared dispersing and stabilizing agent, making use of high speed stirring or other intensive agitation of the mixture, during and after addition. The solids content of the resultant aqueous rosin dispersion is then adjusted by adding a calculated quantity of water thereto.

In accordance with this invention there is provided a method for preparing aqueous dispersions of fortified rosin by the inversion process wherein the use of protective colloids, such as casein, heretofore used in the inversion process is not essential.

In one broad form the invention provides in the inversion process of preparing paper size from fortified rosin wherein molten fortified rosin and water containing a dispersing agent are first mixed to provide an emulsion wherein the molten fortified rosin is the continuous phase and the water is the disperse phase and the emulsion is subsequently inverted by the addition of water to provide an emulsion wherein the water is the continuous phase and the fortified rosin is the disperse phase, the improvement wherein there is employed as the dispersing agent one or more water-soluble compounds of the formulas

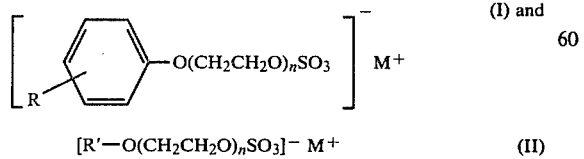

$$[R'-O(CH_2CH_2O)_nSO_3]^- M^+ \quad (II)$$

In formula (I), R is a normal or branched chain alkyl containing from 4 through 18 carbon atoms. In formula (II) R' is a normal or branched chain alkyl or alkenyl or fused ring cycloalkyl containing from 10 through 20 carbon atoms. In formulas (I) and (II), n is an integer such that of the molecular weight of each anion, from about 27% to about 75% thereof is attributable to the $(CH_2CH_2O)$ group and $M+$ is a cation, as hereinafter defined.

In a further broad form the invention provides an invert size for use in sizing paper comprising an aqueous dispersion of fortified rosin stabilized by a dispersing agent, said dispersing agent being at least one of the water-soluble compounds above described.

The process of this invention involves the use of certain specific dispersing agents, to be detailed more fully hereinafter.

The aqueous dispersion prepared by the method of this invention will comprise, by weight, from about 5% to about 70% fortified rosin or fortified rosin blend (fortified rosin blended with unfortified rosin or extender, or both, as hereafter described), preferably from about 10% to 55%; from about 1% to about 10% dispersing agent, preferably from about 2% to about 8%, based on the fortified rosin or fortified rosin blend; and the balance water to 100%.

The rosin used to prepare the fortified rosin employed in this invention can be any of the commercially available types of rosin, such as wood rosin, gum rosin, tall oil rosin, and mixtures of any two or more, in their crude or refined state. Rosins which have a tendency to crystallize may be treated, at elevated temperatures, with formaldehyde or paraformaldehyde in the presence of an acid catalyst, for example, p-toluene-sulphonic acid, in a manner known to those skilled in the art. Thus, formaldehyde treated rosin can be used to prepare the fortified rosin and is included in the expression "rosin" as used herein and in the claims.

The fortified rosin employed is the adduct reaction product of rosin and an acidic compound containing the

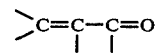

group and is derived by reacting rosin and the acidic compound at elevated temperatures, usually from about 150° C. to about 210° C.

The amount of acidic compound employed will be that amount which will provide fortified rosin containing from about 1% to about 12% by weight, preferably from about 4% to about 9%, by weight, of adducted acidic compound based on the weight of the fortified rosin. Methods of preparing fortified rosin are disclosed and described in U.S. Pat. Nos. 2,628,918 and 2,684,300, reference to which is hereby made.

Examples of acidic compounds containing the

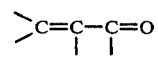

group that can be used to prepare the fortified rosin include the alpha, beta-unsaturated organic acids and their available anhydrides, specific examples of which include fumaric acid, maleic acid, acrylic acid, maleic anhydride, itaconic acid, itaconic anhydride, citraconic acid, and citraconic anhydride. The preferred adducting acid is fumaric acid. Mixtures of acids can be used to prepare the fortified rosin if desired. Also, mixtures of different fortified rosins can be used if desired. Thus, for example, a mixture of the acrylic acid adduct of rosin and the fumaric acid adduct can be used to prepare the invert sizes of this invention.

The fortified rosin can be extended, if desired, by known extenders therefor such as waxes, particularly paraffin wax and microcrystalline wax; hydrocarbon resins including those derived from petroleum hydrocarbons and terpenes; and the like. This is accomplished by melt blending or solution blending with the fortified rosin up to about 100% by weight based on the weight of fortified rosin of the fortified rosin extender. If an extender is to be blended with the fortified rosin, the preferred amount of extender employed will be from about 30% to about 50% by weight based on the weight of the fortified rosin.

Also, blends of fortified rosin and unfortified rosin can be used in carrying out this invention as well as blends of fortified rosin, extender, and unfortified rosin.

Fortified rosin-unfortified rosin blends will comprise about 25% to about 99% fortified rosin and about 75% to about 1% unfortified rosin. Blends of fortified rosin, rosin, and rosin extender will comprise about 25% to 49% fortified rosin, about 5% to 50% unfortified rosin, and about 1% to 50% fortified rosin extender.

If rosin (that is, unfortified rosin) is blended with the fortified rosin, it can be any of those used in the preparation of the fortified rosin as above set forth. In addition, partially or substantially completely hydrogenated rosins and polymerized rosins, can be used if desired.

The dispersing agents used to prepare the dispersions of this invention are water soluble compounds represented by the formulae:

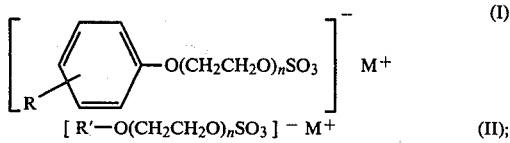

In formula (I), R is a normal or branched chain alkyl containing from 4 through 18 carbon atoms. Examples of alkyl are butyl, isobutyl, pentyl, hexyl, isohexyl, octyl, nonyl, dodecyl, tetradecyl, hexadecyl, and octadecyl.

In formula (II), R' is a normal or branched chain alkyl or alkenyl of fused ring cycloalkyl containing from 10 through 20 carbon atoms, examples of which are decyl, dodecyl (lauryl), tetradecyl, hexadecyl, oleyl, octadecyl, and eicosyl; abietyl or dihydroabietyl.

In formulas (I) and (II), n is an integer such that of the molecular weight of each anion,

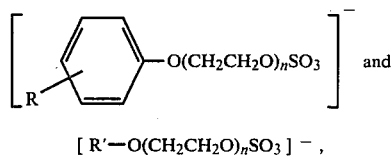

from about 27% to about 75% (preferably from about 27% to 70%, and even more preferably, from about 40% to about 66%) thereof is attributable to the $(CH_2CH_2O)$ groups.

It is pointed out that in the region from 70 to 75% some anions may not work as well as others.

In formulas (I) and (II), $M^+$ is any suitable monovalent cation, other than the hydrogen ion, that will allow substantial dissolution of the dispersing agent in water and will remain in solution under the conditions employed in preparation of the water-in-oil emulsion.

Preferably, in formulas (I) and (II), $M^+$ is an alkali metal ion such as potassium, sodium, lithium and cesium; ammonium ($NH_4+$); mono(hydroxyethyl) ammonium; di(hydroxyethyl)ammonium; monomethylammonium; dimethylammonium; tri(hydroxyethyl)ammonium; morpholinium,; mono(hydroxyisopropyl)ammonium; di(hydroxyisopropyl)ammonium; tri(hydroxyisopropyl)ammonium; 2-(2-hydroxyethoxy)ethyl ammonium; or N-(ethyl)ammonium, or mixtures thereof.

Materials having the structure (I) and (II) can be made by condensing the appropriate alkyl phenol or the appropriate alcohol, with ethylene oxide by known methods, followed by reacting the condensates so formed by known methods to form the salts of the sulfates of the condensates. The value of n is an average value since ethylene oxide condensates varying in chain length are obtained in the condensation reaction. Certain compounds of the formulas (I) and (II) are available commercially, e.g., Alipal CO436 [formula (I)] of GAF Corporation and Polystep B22 [formula (II)] of Stepan Chemical Co.

In carrying out the process of this invention, a known quantity of fortified rosin, together with any desired extender or unfortified rosin, or both, is heated to fusion in a vessel provided with stirring apparatus and heating means to provide a fused resinous mass (fused resin). The temperature of the fused resin will usually be in the range of about 90° C. to about 160° C. If low-melting extenders are to be blended with the fortified rosin, the fused temperature of the blend could be lower than 90° C.

A solution of the dispersing agent in water is added to the fused resin, with continuous stirring of the resin melt, to form an emulsion in which the water is the disperse phase and the fused resin is the continuous phase. The amount of dispersing agent in the aqueous solution will be that sufficient to provide from about 1% to about 10%, preferably, from about 2% to about 8%, by weight of dispersing agent based on the fused resin. The amount of water employed at this stage is that amount sufficient to provide an emulsion as above described having a total solids content of, by weight, from about 70% to 86%, depending upon the particular dispersing agent used and its concentration.

Subsequently, additional hot water (inversion water) at a temperature of about 70° C. and higher is added with vigorous stirring. At a water to resin ratio of about 30:70 the emulsion inverts, the water becoming the continuous phase and the resin becoming the dispersed phase. On cooling, the resin solidifies and there is provided an aqueous dispersion of finely divided resin particles. The resin particles will be fortified rosin particles or particles of fortified rosin blend as above described. The aqueous dispersion can be diluted to a lower solids content, if desired, by the addition of water.

It has been determined that dispersions of this invention have good stability at a pH of from about 3.0 to about 5.5. Adjustment of the pH can be made by adding an alkali, preferably sodium hydroxide, to the inversion water or to the aqueous solution of dispersing agent in an amount to bring the aqueous dispersion to the desired pH.

It will be understood by those skilled in the art, that the process of this invention can be carried out in an open vessel at atmospheric pressure or under pressure, in a closed vessel.

As above set forth, the initial temperature of the fused resin (fortified rosin or fortified rosin blend) will be in the range of about 90° C. to about 160° C. If the process is carried out at atmospheric pressure and the initial resin temperature is above 100° C., the temperaure will drop on addition of the aqueous solution of dispersing agent due to partial evaporation of the water. If the preparation is carried out in a closed vessel under steam pressure so that evaporation of the water is retarded, the temperature can be maintained at a level above 100° C. The rate of addition of the aqueous solution of dispersing agent and the inversion water and degree of agitation can be varied over a wide range and is within the skill of the art. However, the rate of addition of inversion water and degree of agitation are normally speeded up at the point of inversion to insure rapid and complete inversion to the resin-in-water dispersion. The temperature at the point of inversion is in the range of about 70° C. to about 150° C., and preferably from about 90° C. to about 130° C.

The process can also be carried out in two stages by feeding the molten resin and the hot water solution of the dispersing agent to a mixer to provide the water-in-resin dispersion. Subsequently, the water-in-resin dispersion and hot inversion water are fed, in separate streams, to a second mixer maintained at a temperature of about 70° C. to 150° C. where the inversion takes place. The resulting aqueous dispersion is then recovered from the second mixer.

It is apparent that relatively uncomplicated equipment (a homogenizer not being required) and mild preparative conditions are employed in the process of this invention, an advantage over previous methods for preparation of high free fortified rosin paper sizes of equivalent sizing efficiency.

Stable resin-in-water dispersions are prepared by the process of this invention. The particles comprising the dispersed phase are relatively small, not more than about 10% of the particles being larger than about 0.4 micron.

EXAMPLE A

This example illustrates the preparation of fumaric acid fortified rosin. Fumaric acid, 6 parts, was adducted, at a temperature of about 200° C. with 1% formaldehyde treated Chinese gum rosin, 94 parts. The fumaric acid dissolves in the fused gum rosin and reacts therewith to provide fumaric acid fortified gum rosin. After substantially all the fumaric acid has reacted with the gum rosin, the fortified rosin was cooled to room temperature (about 23° C.).

The following examples illustrate the preparation of fortified rosin dispersions in accordance with this invention. All parts and percentages are by weight unless otherwise specified.

EXAMPLE 1

100 Parts of the fortified rosin of Example A was heated to 180° C. to insure complete melting and then cooled to about 130° C. A (~95° C.) solution of 4.2 parts of dispersing agent having the structure of formula (I) wherein R is nonyl, n is 10 (the % (CH$_2$CH$_2$O) groups in anion is 59.5), and M$^+$ is NH$_4$+ in 17 parts water was added slowly (1 to 2 min.) to the fused fortified rosin with stirring. Rate of addition was limited by foaming due to flashing of water. Because of the initial high temperature of the fortified rosin, much of the water distilled out of the mixture. At the end of the addition, the temperature of the mixture was 95° C. to 101° C. Additional hot water (~95° C.) was added slowly to give a mixture with 15 to 20 parts water and with the typical smooth creamy-white appearance of a water-in-oil type emulsion ready to be inverted. After the last water addition was complete, stirring was continued for a minute or two to insure that the mixture was homogeneous. Then, about 170 parts of hot (~95° C.) water was added quickly (~1 min.) with vigorous stirring to invert the emulsion. The completed emulsion (35% total solids) was cooled to room temperature and bottled. On storage for 30 days, only 1.1% of solids settled from the emulsion, a measure of small particle size and excellent stability. In sizing tests on a pilot paper machine making 40 lb./3000 sq. ft. paper at a pH 4.5, using 0.3% size solids based on the dry weight of the paper, with 2.5 added alum, duplicate runs gave a Hercules Sizing Test (H.S.T.) value of 64 seconds and 74 seconds. These test results show good sizing.

EXAMPLE 2

91 Parts formaldehyde treated Chinese gum rosin and 9 parts fumaric acid were heated in a stirred autoclave for three hours at 200° C. Analysis of the reaction mass showed 8.55% combined fumaric acid and 0.15% free fumaric acid. The reaction mass was cooled to about 130° C. The autoclave was pressured to 25 psi with steam and 6 parts of a dispersing agent having the structure of formula (I) wherein R is nonyl, n is 12 (the % (CH$_2$CH$_2$O) groups in anion is 63.8), and M is NH$_4$ in 18 parts water preheated to about 45° C. was added with good stirring. Stirring was continued for about three minutes to insure good mixing. Then about 141 parts hot (~120° C.) water, containing about 0.05 part NaOH, was added rapidly with good stirring to invert the original water-in-resin emulsion. The resulting emulsion, which had a solids content of about 38.7%, was cooled to room temperature and discharged. In sizing tests, as described in Example 1, H.S.T. values were 91 seconds and 109 seconds. The results show good sizing.

EXAMPLE B

This example illustrates the preparation of a fortified rosin-unfortified rosin blend. 92.3 Parts of Chinese gum rosin and 7.7 parts of fumaric acid were heated in a reaction vessel at 200° C. for 3½ hours. Some of the reaction mass, 20 parts, was removed from the reaction vessel and then 20 parts of unfortified Chinese gum rosin was added. Analysis of the resulting fortified rosin-unfortified rosin blend shows 6.2% combined fumaric acid, 0.175% free fumaric acid, and an acid value of 208.

EXAMPLES 3-19

In these examples, the following ingredients were employed

Fortified rosin-unfortified rosin rosin blend of Example B: 360 grams 13.2% Aqueous solution of dispersing agent (15.2 grams of dispersing agent and 100 parts de-ionized water): 115.2 grams De-ionized water containing NaOH-inversion water (539.3 parts de-ionized water and 0.3 gram NaOH): 539.6 grams.

The fortified rosin-unfortified rosin blend was heated in stirred autoclave to 170° C. over a period of 80 minutes to provide a molten mass which was subsequently cooled to 135° C. At 150° C., stirring of the molten mass is commenced and continued throughout the process. The aqueous solution of dispersing agent was forced into the autoclave under 20 p.s.i. nitrogen. As a water-in-resin emulsion is formed, the temperature dropped to 125° C.–127° C. and the pressure in the autoclave rose to 15 p.s.i. The autoclave pressure was then reduced to 5–8 p.s.i. by blowing out the nitrogen and some steam. The inversion water, heated to a pressure of 25 p.s.i. (115° C.–118° C.) was forced into the acutoclave within three minutes of the aqueous solution of dispersing agent. The resin-in-water emulsion was cooled to 40° C. Formalin (0.2%) was added to the resulting dispersion to prevent bacterial or fungal growth. The dispersion was then strained through 200 mesh nylon. Table I shows 7 day stability results using formula (I) dispersing agent and Table II shows 7 day stability results using formula (II) dispersing agent.

TABLE 1

Formula (I) Dispersing Agent

| Ex. No. | R | N | % CH$_2$CH$_2$O groups in anion | M | Total Solids % | % Settled Solids After 7 days |
|---|---|---|---|---|---|---|
| 3 | nonyl | 3 | 30.5 | NH$_4$+ | 37.4 | 0.5 |
| 4 | nonyl | 5 | 42.3 | NH$_4$+ | 38.0 | 6.3 |
| 5 | nonyl | 9 | 56.9 | NH$_4$+ | 36.9 | 0.0 |
| 6 | nonyl | 10 | 59.5 | NH$_4$+ | 37.7 | 0.5 |
| 7 | nonyl | 11 | 61.7 | NH$_4$+ | 36.7 | 1.0 |
| 8 | nonyl | 12 | 63.8 | NH$_4$+ | 36.9 | 0.5 |
| 9 | nonyl | 13 | 65.6 | NH$_4$+ | 36.8 | 1.3 |
| 10 | nonyl | 15 | 68.7 | NH$_4$+ | 36.9 | 1.9 |
| 11 | octyl | 5 | 43.5 | NH$_4$+ | 36.1 | 1.7 |
| 12 | octyl | 7 | 51.9 | NH$_4$+ | 37.3 | 1.3 |
| 13 | dodecyl | 9 | 53.6 | NH$_4$+ | 36.2 | 0.3 |
| 14 | nonyl | 5 | 42.3 | Na+ | 37.0 | 0.0 |
| 15 | nonyl | 20 | 74.6 | Na+ | 36.9 | 1.3 |
| 16 | nonyl | 20 | 74.6 | NH$_4$+ | 36.5 | 8.5 |
| 17 | octyl | 13 | 66.7 | NH$_4$+ | 37.8 | 27.2 |

TABLE II

Formula (II) Dispersing Agent

| Ex. No. | R' | n | % CH$_2$CH$_2$O groups in anion | M | Total Solids % | % Settled Solids After 7 days |
|---|---|---|---|---|---|---|
| 18 | lauryl | 16 | 72.6 | NH$_4$+ | 37.4 | 2.9 |
| 19 | cetyl and oleyl mixture | 10 | 56.7 | NH$_4$+ | 37.2 | 1.6 |

The dispersing agent of Example 19 was prepared from a mixture of cetyl alcohol and oleyl alcohol.

% Settled solids were calculated from an analysis of % solids of the dispersion near the surface initially and after 7 days standing.

in formulae (I) and (II), n has been arbitrarily determined as an integer such that the molecular weight of each anion, from about 27% to about 75% thereof is attributed to the (CH$_2$CH$_2$O) group.

However, it has been found that at the extremities of the range of the (CH$_2$CH$_2$O) content of the formulas (I) and (II) anions some R or R' groups provide much better dispersing agents than others.

Some will have ranges of (CH$_2$CH$_2$O) content beyond the range of other R and R' groups.

Thus, to define the (CH$_2$CH$_2$O) range as a component of formulas (I) and (II) for each particular R or R' the integer n is replaced by k as follows:

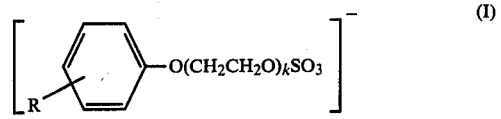

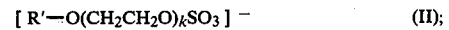

wherein k is defined as a suitable integer which provides a dispersing agent which will form a stable water-in-oil emulsion with molten rosin and invert on the addition of the inversion water to produce a stable oil-in-water emulsion.

To determine a suitable value of k or the boundaries of k for any particular known R or R' the following method is used:

(i) a 15 weight % aqueous solution of the dispersing agent of formula (I) or (II) having a known R or R', and n is added to the molten fortified rosin in an actoclave at about 20 p.s.i. and about 135° C., such that there ae 6 parts of dispersing agent per 100 parts by weight of the molten rosin. The mass is then stirred for 3 minutes to ensure good mixing.

If a water-in-oil emulsion is formed in Step (i) then:

(ii) inversion water is added to the autoclave at a pressure of 25 p.s.i. and a temperature of about 120° C.

If the emulsion then inverts to give an oil-in-water emulsion, then k is a suitable value.

If there is no inversion, then k is too low and must be increased.

If after step (i) a water-in-oil emulsion is not formed, then k is too high and must be reduced.

It is to be understood that the above description, including examples, is illustrative of the invention and not in limitation thereof.

What we claim and desire to secure by Letters Patent is:

1. In the inversion process of preparing paper size from fortified rosin wherein molten fortified rosin and water containing a dispersing agent are first mixed to provide a water-in-oil emulsion wherein the molten fortified resin is the continuous phase and the water is the disperse phase and the emulsion is subsequently inverted by the addition of water to provide an emulsion wherein the water is the continuous phase and the fortified rosin is the disperse phase, the improvement wherein there is employed as the dispersing agent one or more water-soluble compounds of the formulae

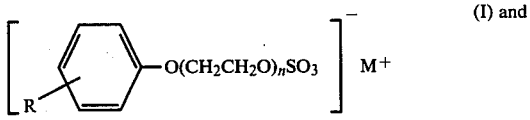

wherein in formula (I), R is a normal or branched chain alkyl containing from 4 through 18 carbon atoms; wherein in formula (II) R' is a normal or branched chain alkyl or alkenyl or fused ring cycloalkyl containing from 10 through 20 carbon atoms; wherein in formulas (I) and (II), n is an integer such that of the molecular weight of each anion, from about 27% to about 75% thereof is attributable to the (CH$_2$CH$_2$O) group, and M$^+$ is a monovalent cation, other than hydrogen, that will allow substantial dissolution of said dispersing agent in water and will remain in solution during the preparation of the water-in-oil emulsion.

2. The process as claimed in claim 1 wherein M$^+$ is an alkali metal ion; ammonium; mono(hydroxyethyl) ammonium; di(hydroxyethyl) ammonium; monomethylammonium; dimethylammonium; tri(hydroxyethyl) ammonium; morpholinium; mono(hydroxyisopropyl) ammonium; di(hydroxyisopropyl) ammonium; tri(hydroxyisopropyl) ammonium; 2-(2-hydroxyethoxy)ethyl ammonium; N-ethyl-ammonium or mixtures thereof.

3. The process of claim 1 wherein n is an integer such that of the molecular weight of the anion, from about 27% to about 70% thereof is attributable to the (CH$_2$CH$_2$O) groups.

4. The process of claim 2 wherein n is an integer such that of the molecular weight of the anion, from about 27% to about 70% thereof is attributable to the (CH$_2$CH$_2$O) groups.

5. The process of claim 1 wherein the dispersing agent is the formula (I) compound and wherein n is an integer such that of the molecular weight of the anion, from about 40% to about 66% thereof is attributable to the (CH$_2$CH$_2$O) groups.

6. The process of claim 2 wherein the dispersing agent is the formula (I) compound and wherein n is an integer such that of the molecular weight of the anion, from about 40% to about 66% thereof is attributable to the (CH$_2$CH$_2$O) groups.

7. The process of claim 1 wherein the dispersing agent is the formula (II) compound and wherein n is an integer such that of the molecular weight of the anion, from about 40% to about 66% thereof is attributable to the (CH$_2$CH$_2$O) groups.

8. The process of claim 2 wherein the dispersing agent is the formula (II) compound and wherein n is an integer such that of the molecular weight of the anion, from about 40% to about 66% thereof is attributable to the (CH$_2$CH$_2$O) groups.

9. The process of claim 1 wherein the molten fortified rosin has blended therewith unfortified rosin so as to provide a blend comprising, by weight, from about 25% to about 99% fortified rosin and about 75% to about 1% unfortified rosin.

10. The process of claim 2 wherein the molten fortified rosin has blended therewith unfortified rosin so as to provide a blend comprising, by weight, from about 25% to about 99% fortified rosin and about 75% to about 1% unfortified rosin.

11. The process of claim 3 wherein the molten fortified rosin has blended therewith unfortified rosin so as to provide a blend comprising, by weight, from about 25% to about 99% fortified rosin and about 75% to about 1% unfortified rosin.

12. The process of claim 4 wherein the molten fortified rosin has blended therewith unfortified rosin so as to provide a blend comprising, by weight, from about 25% to about 99% fortified rosin and about 75% to about 1% unfortified rosin.

13. The process of claim 5 wherein the molten fortified rosin has blended therewith unfortified rosin so as to provide a blend comprising, by weight, from about 25% to about 99% fortified rosin and about 75% to about 1% unfortified rosin.

14. The process of claim 6 wherein the molten fortified rosin has blended therewith unfortified rosin so as to provide a blend comprising, by weight, from about 25% to about 99% fortified rosin and about 75% to about 1% unfortified rosin.

15. The process of claim 7 wherein the molten fortified rosin has blended therewith unfortified rosin so as to provide a blend comprising, by weight, from about 25% to about 99% fortified rosin and about 75% to about 1% unfortified rosin.

16. The process of claim 8 wherein the molten fortified rosin has blended therewith unfortified rosin so as to provide a blend comprising, by weight, from about 25% to about 99% fortified rosin and about 75% to about 1% unfortified rosin.

17. The process of claim 3 wherein the dispersing agent is the formula (I) compound and wherein R is octyl, nonyl, or dodecyl or mixtures thereof.

18. The process of claim 3 wherein the dispersing agent is the formula (II) compound and wherein R' is C$_{12}$ to C$_{18}$.

19. The process of claim 1 wherein the dispersing agent is the formula (I) compound and wherein R is nonyl.

20. The process of claim 1 wherein said process is carried out in the absence of a protective colloid such as casein.

21. An invert size for use in sizing paper comprising an aqueous dispersion of fortified rosin stabilized by a dispersing agent, said dispersing agent being one or more water-soluble compounds of the formulas

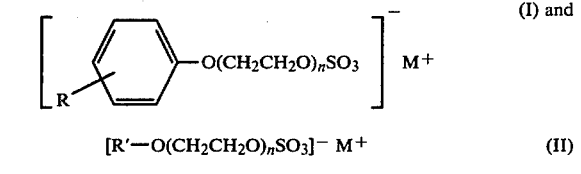

$$[R'-O(CH_2CH_2O)_nSO_3]^- \ M^+ \quad (II)$$

wherein in formula (I), R is a normal or branched chain alkyl containing from 4 through 18 carbon atoms; wherein in formula (II) R' is a normal or branched chain alkyl or alkenyl or fused ring cycloalkyl containing from 10 through 20 carbon atoms; wherein in formulas (I) and (II), n is an integer such that of the molecular weight of each anion, from about 27% to about 75% thereof is attributable to the (CH$_2$CH$_2$O) group, and M$^+$ is a monovalent cation, other than hydrogen.

22. The invert size as claimed in claim 21 wherein M$^+$ is an alkali metal ion; ammonium; mono(hydroxyethyl) ammonium; di(hydroxyethyl) ammonium; monomethylammonium; dimethylammonium; tri(hydroxyethyl) ammonium; morpholinium; mono(hydroxyisopropyl) ammonium; di(hydroxyisopropyl) ammonium; tri(hydroxyisopropyl) ammonium; 2-(2-hydroxyethoxy)ethyl ammonium; N-ethyl-ammonium or mixtures thereof.

23. The invert size of claim 21 wherein n is an integer such that, of the molecular weight of the anion, from about 27% to about 70% thereof is attributable to the (CH$_2$CH$_2$O) groups.

24. The invert size of claim 22 wherein n is an integer such that, of the molecular weight of the anion, from about 27% to about 70% thereof is attributable to the (CH$_2$CH$_2$O) groups.

25. The invert size of claim 21 wherein the dispersing agent is the formula (I) compound and wherein n is an integer such that, of the molecular weight of the anion, from about 40% to about 66% thereof is attributable to the ($CH_2CH_2O$) groups.

26. The invert size of claim 22 wherein the dispersing agent is the formula (I) compound and wherein n is an integer such that, of the molecular weight of the anion, from about 40% to about 66% thereof is attributable to the ($CH_2CH_2O$) groups.

27. The invert size of claim 21 wherein the dispersing agent is the formula (II) compound and wherein n is an integer such that, of the molecular weight of the anion, from about 40% to about 66% thereof is attributable to the ($CH_2CH_2O$) groups.

28. The invert size of claim 22 wherein the dispersing agent is the formula (II) compound and wherein n is an integer such that, of the molecular weight of the anion, from about 40% to about 66% thereof is attributable to the ($CH_2CH_2O$) groups.

29. The invert size of claim 21, wherein the fortified rosin has blended therewith unfortified rosin so as to provide a blend comprising, by weight, from about 25% to about 99% fortified rosin and about 75% to about 1% unfortified rosin.

30. The invert size of claim 22, wherein the fortified rosin has blended therewith unfortified rosin so as to provide a blend comprising, by weight, from about 25% to about 99% fortified rosin and about 75% to about 1% unfortified rosin.

31. The invert size of claim 23, wherein the fortified rosin has blended therewith unfortified rosin so as to provide a blend comprising, by weight, from about 25% to about 99% fortified rosin and about 75% to about 1% unfortified rosin.

32. The invert size of claim 24, wherein the fortified rosin has blended therewith unfortified rosin so as to provide a blend comprising, by weight, from about 25% to about 99% fortified rosin and about 75% to about 1% unfortified rosin.

33. The invert size of claim 25, wherein the fortified rosin has blended therewith unfortified rosin so as to provide a blend comprising, by weight, from about 25% to about 99% fortified rosin and about 75% to about 1% unfortified rosin.

34. The invert size of claim 26, wherein the fortified rosin has blended therewith unfortified rosin so as to provide a blend comprising, by weight, from about 25% to about 99% fortified rosin and about 75% to about 1% unfortified rosin.

35. The invert size of claim 27, wherein the fortified rosin has blended therewith unfortified rosin so as to provide a blend comprising, by weight, from about 25% to about 99% fortified rosin and about 75% to about 1% unfortified rosin.

36. The invert size of claim 28, wherein the fortified rosin has blended therewith unfortified rosin so as to provide a blend comprising, by weight, from about 25% to about 99% fortified rosin and about 75% to about 1% unfortified rosin.

37. The invert size of claim 21 wherein the dispersing agent is the formula (I) compound and wherein R is octyl, nonyl or dodecyl or mixtures thereof.

38. The invert size of claim 37 wherein the dispersing agent is the formula (I) compound and wherein R is nonyl.

39. The invert size of claim 21 wherein the dispersing agent is the formula (II) compound and wherein R' is $C_{12}$ through $C_{18}$.

40. The process as claimed in claim 2 wherein $M^+$ is an alkali metal selected from the group consisting of sodium, potassium, and lithium.

41. The invert size as claimed in claim 22 wherein $M^+$ is an alkali metal selected from the group consisting of sodium, potassium, and lithium.

* * * * *